United States Patent
Kover, Jr. et al.

(10) Patent No.: US 6,552,492 B2
(45) Date of Patent: Apr. 22, 2003

(54) AUTOMATIC ADVERSE WEATHER REAR LIGHT SYSTEM FOR MOTOR VEHICLES

(76) Inventors: Joseph Kover, Jr., 974 N. Aspen Way, Layton, UT (US) 84040; Joseph David Kover, 463 W. Creekside La., Kaysville, UT (US) 84037

( * ) Notice: Subject to any disclaimer, the term of this patent is extended or adjusted under 35 U.S.C. 154(b) by 1 day.

(21) Appl. No.: 09/877,787

(22) Filed: Jun. 11, 2001

(65) Prior Publication Data

US 2002/0195948 A1 Dec. 26, 2002

(51) Int. Cl.[7] ............................................. G06F 17/00
(52) U.S. Cl. .................. 315/77; 362/464; 362/465; 362/276; 340/469
(58) Field of Search .......................... 315/77, 80, 82; 340/462–464, 469, 359, 902, 903; 362/284, 324, 276, 464–466

(56) References Cited

U.S. PATENT DOCUMENTS 6,049,749 A * 4/2000 Kobayashi .................. 701/49
6,121,896 A * 9/2000 Rahman ..................... 340/902
6,254,259 B1 * 7/2001 Kobayashi .................. 362/465

* cited by examiner

Primary Examiner—Haissa Philogene
Assistant Examiner—Wilson Lee (57) ABSTRACT

The present invention relates to an automatic adverse weather rear light system which automatically activates the adverse weather rear light source or light sources. Also, to avoid outshining (masking) either the brake lights or the turn signal/emergency flasher lights the luminosity of these lights is automatically increased to where their luminosity always greater than the luminosity of the adverse weather rear light source or light sources. Another embodiment of the adverse weather rear light system automatically activates and progressively either increases or decreases the luminosity of the adverse weather rear light source or light sources as the current visibility conditions decrease or increase. Also, to avoid outshining (masking) either the brake lights or the turn signal/emergency flasher lights the luminosity of these lights is automatically increased to where their luminosity is always greater the luminosity of the adverse weather rear light source or light sources.

13 Claims, 13 Drawing Sheets

AUTOMATIC ADVERSE WEATHER REAR LIGHT SYSTEM FOR MOTOR VEHICLES

BACKGROUND OF THE INVENTION

The present invention relates to an automatic adverse weather rear light system and a corresponding control system for motor vehicles where the corresponding control system serves to detect a decrease in the current visibility conditions due to either adverse weather conditions, smoke, or dust, and further to automatically activate the adverse weather rear light system which is comprised of the adverse weather rear light source or light sources. Also, to avoid outshining either the brake lights or the turn signal/emergency flasher lights the adverse weather rear light system includes a provision to automatically increase the luminous level of these lights to a luminosity which is greater than the luminosity of the adverse weather rear light source or light sources.

The vehicle industry has, for years, primarily focused on increasing the conspicuity of the front of the vehicle with the addition of fog lights and daytime running lights while ignoring the rear of the vehicle which becomes inconspicuous as visibility decreases due to either adverse weather conditions, smoke, or dust. The current luminosity level of the vehicle rear light system is adequate during normal conditions however, the luminosity level is inadequate as visibility decreases due to either adverse weather, smoke, or dust. The fact that the current luminosity level fails to provide adequate conspicuity for the rear of the vehicle is substantiated by the number of rear end collisions, the number of vehicles involved, and the severity of these collisions as the visibility decreases due to either adverse weather conditions, smoke, or dust. It is the objective of the present invention, therefore, to increase the conspicuity of the rear of the vehicle as the visibility decreases, which in turn would significantly reduce the number of rear end collisions, and in such manner as to not outshine either the brake lights or the turn signal/emergency flasher lights, which could result either in an accident or irritate an approaching motorist and incite a road rage incident, which is increasing at an alarming rate.

The concept of a rear fog light system in conjunction with a control system has only recently been introduced in the United States, and only one of these systems submits an adjustable system that is dependent upon ambient light conditions (U.S. Pat. No. 6,016,035 issued to Eberspacher, Gauch, Haf, and Robel in January, 2000), The system further includes a fog tail light which may be turned off upon detection of an approaching vehicle by means of an electrochromic interior rear view mirror. However, such a system embodies several disadvantages. One disadvantage of this system is that it fails to consider the truck population which comprises a significant number of the motor vehicles on the road today, and of these trucks the majority have shells installed on the back which completely block the interior rear view mirror effecting such a system void. A second disadvantage is that this system fails to recognize the fact that tractor trucks, of the rapidly increasing transportation industry, do not provide for an interior rear view mirror which again would nullify such a system. Another disadvantage is that this fails to consider the sport utility and the van population which additionally comprises a significant number of the motor vehicles on the road and introduces a unique issue. It is common for the rear window of such vehicles to become soiled with spray and dirt from the roadways produced by the rear wheels during adverse weather, and the majority of these vehicles do not have rear windshield wipers. The result is that the spray and dirt obstructs the interior rear view mirror and therefore negates such a system. Additionally, during periods of decreased visibility due to adverse weather conditions the system is designed to turn off the rear fog light when a vehicle approaches. The action of where the rear fog light is initially at full luminosity and then extinguished as a vehicle approaches could easily be mistaken, by an approaching motorist, as the application and the release of the brakes and result in a rear end collision.

The rear fog light system and corresponding control system (U.S. Pat. No. 5,894,272 issued to Brassier and Rydel in April, 1999 and U.S. Pat. No. 5,349,267 issued to Brassier, Rydel, and Medjaoui in September, 1994). also embodies several disadvantages. One major disadvantage of this system is that the rear fog lights would outshine either the brake lights or the turn signal/emergency flasher lights and result in an accident since an approaching motorist would conceivably fail to observe that either the brakes have been applied, the vehicle is signaling a turn, or the vehicle is signaling an roadside emergency with the emergency flashers while parked along the roadway. Another disadvantage of this system is that the rear fog lights have no provisions to reduce the luminosity level between the hours of dusk to dawn such a system therefore could either blind or irritate an approaching motorist and result in either an accident or incite a road rage incident. An additional disadvantage of this system is that there is no provision for the automatic activation of the rear fog lights. Instead, the motor vehicle operator is required to manually activate the rear fog lights upon observing the low visibility warning light, and should the motor vehicle operator fail to observe the low visibility warning and activate the rear fog lights the risk of an accident would be significantly increased. Another disadvantage of these systems is that the operation only addresses limited visibility due to fog and ignores the limited visibility conditions resulting from rain, snow, hail, sleet, smoke, or dust.

SUMMARY OF THE INVENTION

The present invention relates to an automatic adverse weather rear light system and a corresponding control system for motor vehicles where the corresponding control system serves to detect a decrease in the current visibility conditions due to either adverse weather conditions, smoke, or dust and, further to automatically activate the adverse weather rear light system which is comprised of the adverse weather rear light source or light sources. Also, to avoid outshining either the brake lights or the turn signal/emergency flasher lights the adverse weather rear light system further includes a provision to automatically increase the luminous level of these lights to a luminosity which is greater than the luminosity of the adverse weather rear light source or light sources.

In one preferred embodiment of the invention the adverse weather rear light system is comprised of a light source or light sources which are positioned such as to increase the conspicuity of the rear of the non-represented vehicle, and where the light source or light sources may be either a separate light source or light sources or an integral part of any light source or light sources of the vehicle. The adverse weather rear light system is further comprised of a control system which collects current environmental conditions: relative humidity, temperature, ambient light, and current visibility conditions where such a system is commercially available from SENTEC Corporation (U.S. Pat. No. 5,982,288 issued to Sawatari, Gaubis, and Chametski in November 1999). The control system further collects the current state of the vehicle: the state of the ignition switch, the state of the windshield wiper switch, the state of the brake pedal switch, the state of turn signal switch, and the state of the emergency flasher switch. The microcontroller unit serves to receive and combine the current environmental conditions with that of the current state of the vehicle to determine if the conditions are such as to warrant the automatic activation of the adverse weather rear light source or light sources and to automatically increase the luminous level of the brake lights and the turn signal/emergency flasher lights to a luminosity which is greater than the luminosity of the adverse weather rear light source or light sources. If the visibility conditions have decreased to a predetermined low visibility threshold limit due to adverse weather conditions, smoke, or dust, the adverse weather rear light system would then automatically energize to the luminous level as prescribed by federal or state standards. Likewise, when the current visibility conditions are greater than the low visibility threshold limit the adverse weather rear light system would automatically deactivate.

The adverse weather rear light system, to avoid outshining either the brake lights or the turn signal/emergency flasher lights would also automatically increase the luminosity of the brake lights and the turn signal/emergency flasher lights to a luminous level which is greater than the luminosity of the adverse weather rear light source or light sources. Additionally, when the current visibility conditions are greater than the low visibility threshold limit, the adverse weather rear light system would automatically deactivate, and the luminous level of the brake lights and the turn signal/emergency flasher lights would return to the standard luminous level. Furthermore, to avoid either an accident or incite a road rage incident, which is increasing at an alarming rate, the adverse weather rear light system would automatically reduce the luminous level of the adverse weather rear light source or light sources as well as the luminous level of the brake lights and the turn signal/emergency lights during periods of low ambient light. However, the luminosity of the brake lights and the turn signal/emergency flasher lights, would continue to remain greater than the luminosity of the adverse weather rear light source or light sources.

Another preferred embodiment of the adverse weather rear light system is where the system would progressively increase and decrease the luminous level of the light source or light sources. The light source or light sources would automatically activate when visibility conditions decrease to a predetermined low visibility threshold limit due to either adverse weather conditions, smoke, or dust, and the luminosity of the light source or light sources would continue to progressively increase the luminous level of the light source or light sources as the current visibility conditions continue to decrease. Likewise, the luminosity of the light source or light sources would progressively decrease as the current visibility conditions continue to increase, and when the current visibility conditions are greater than the low visibility threshold limit the light source or light sources would then automatically deactivate.

An illustration of this concept is if either the federal or state standards require that the conventional vehicle tail lights are to be visible from a distance of 500 feet and the current visibility conditions decrease from 500 feet to between 500 feet and 450 feet the adverse weather rear light system would automatically activate and the luminous level of the light source or light sources would increase such that the light source or light sources are again visible from 500 feet. If the current visibility conditions further decrease from between 500 and 450 feet to between 450 and 400 feet the luminous level of the light source or light sources would further increase such that the light source or light sources are again visible from 500 feet. Again, if the current visibility conditions further decrease from between 450 and 400 feet to between 300 and 250 feet the luminous level of the light source or light sources would further increase such that the light source or light sources are again visible from 500 feet. When, however, the current visibility conditions increase from between 300 and 250 feet to between 400 and 350 feet then the luminous level of the light source or light sources would decrease such that the light source or light sources are again visible from 500 feet.

The adverse weather rear light system, to avoid outshining either the brake lights or the turn signal/emergency flasher lights, also would progressively increase the luminosity of the brake lights and the turn signal/emergency flasher lights, so that the luminosity of the brake lights and the turn signal/emergency flasher lights would continue to be greater than the luminosity of the adverse weather rear light source or light sources. Additionally, as the luminosity of the adverse weather rear light source or light sources progressively decreases, the luminosity of the brake lights and the turn signal/emergency flasher lights also would progressively decrease. The luminosity of the brake lights and the turn signal/emergency flasher lights, however, would remain greater than the luminosity of the adverse weather rear light source or light sources, and when the adverse weather rear light source or light sources automatically deactivate, and the luminous level of the brake lights and the turn signal/emergency flasher lights would return to the standard luminous level.

An illustration of this concept is if either the federal or state standards require that the conventional vehicle brake lights and the turn signal/emergency flasher lights are to be visible from a distance of 700 feet and the current visibility conditions decrease from 500 feet to between 500 feet and 450 feet resulting in the automatic activation of the adverse weather rear light system the luminosity of the brake lights and the turn signal/emergency flasher lights would increase such that these lights are again visible from 700 feet. If the current visibility conditions further decrease from between 500 and 450 feet to between 450 and 400 feet the luminous level of the brake lights and the turn signal/emergency flasher lights would further increase such that the light source or light sources are again visible from 700 feet. Again, if the current visibility conditions further decrease from between 450 and 400 feet to between 200 and 150 feet the luminous level of the brake lights and the turn signal/emergency flasher lights would further increase such that these lights would are again visible from 700 feet. When, however, the current visibility conditions increase from between 200 and 150 feet to between 300 and 250 feet the luminous level of the brake lights and the turn signal/emergency flasher lights would then decrease such that these lights are again visible from 700 feet.

DETAILED DESCRIPTION OF THE PREFERRED EMBODIMENTS

Figure 1A:
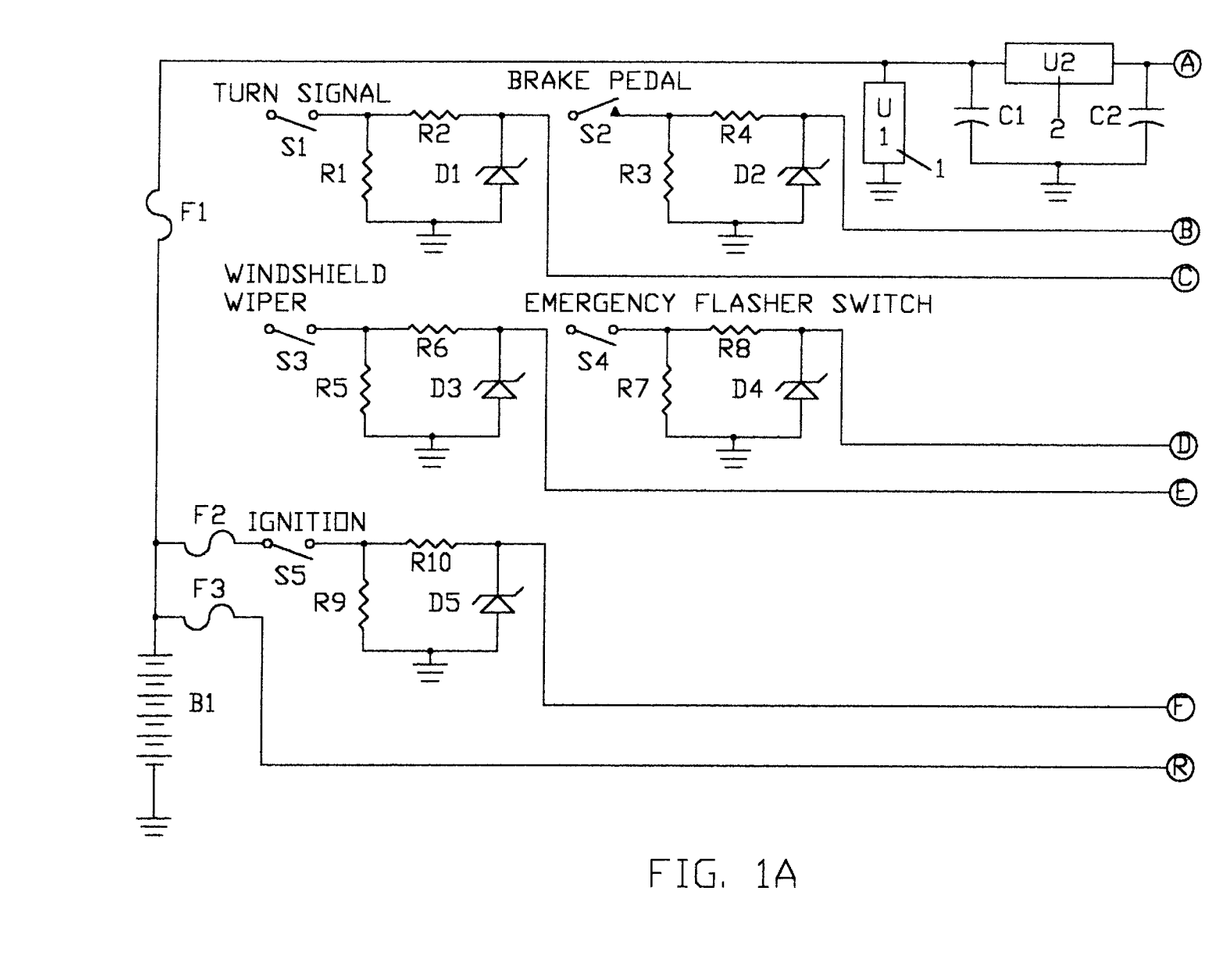
FIG. 1A is the circuit diagram of the front end of the automatic adverse weather rear light system which shows how the vehicle inputs are interfaced with the system.
Figure 1B:
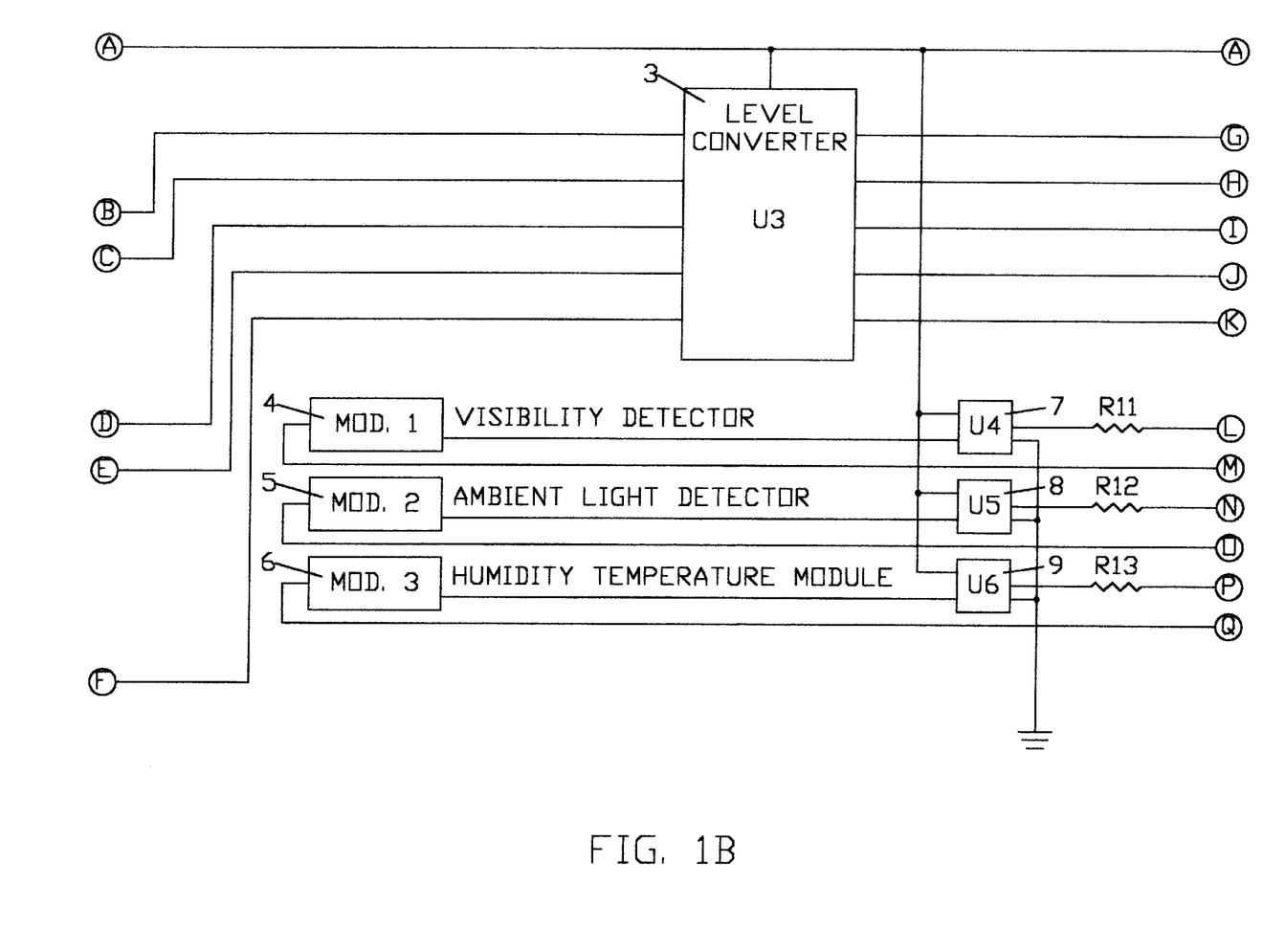
FIG. 1B is the circuit diagram of the logic level down converter, the environmental data collection, the solid state relays, and a block diagram of the environmental data collection process.
Figure 1C:
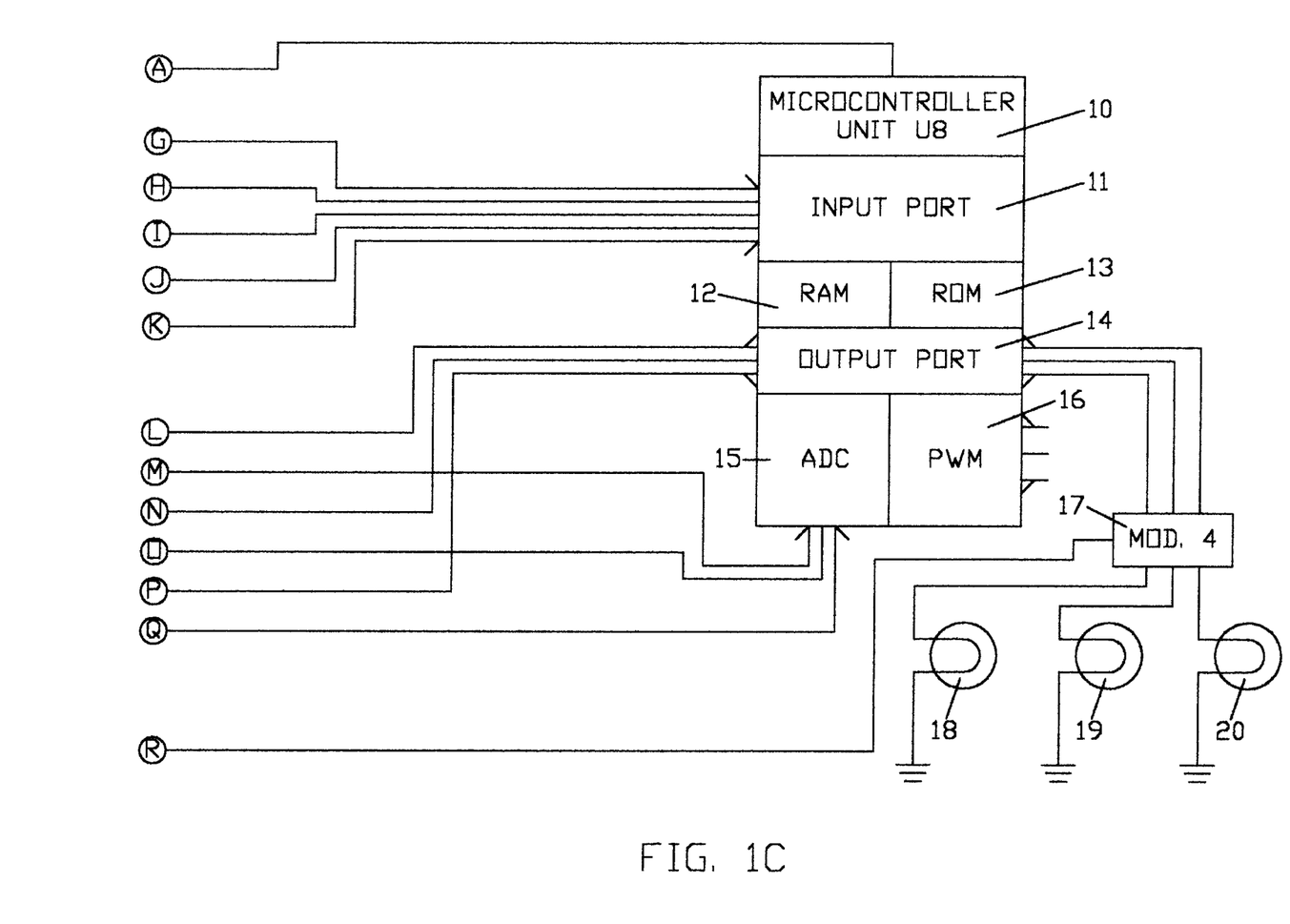
FIG. 1C is a circuit diagram of the microcontroller unit, where the environmental information and the state of the vehicle are received and combined, which represents the interface between the automatic adverse weather rear light system, the environmental data collection modules, and the interface between the microcontroller unit and the light source or light sources, the brake lights, the turn signal lights, and the emergency flasher lights.
Figure 1D:
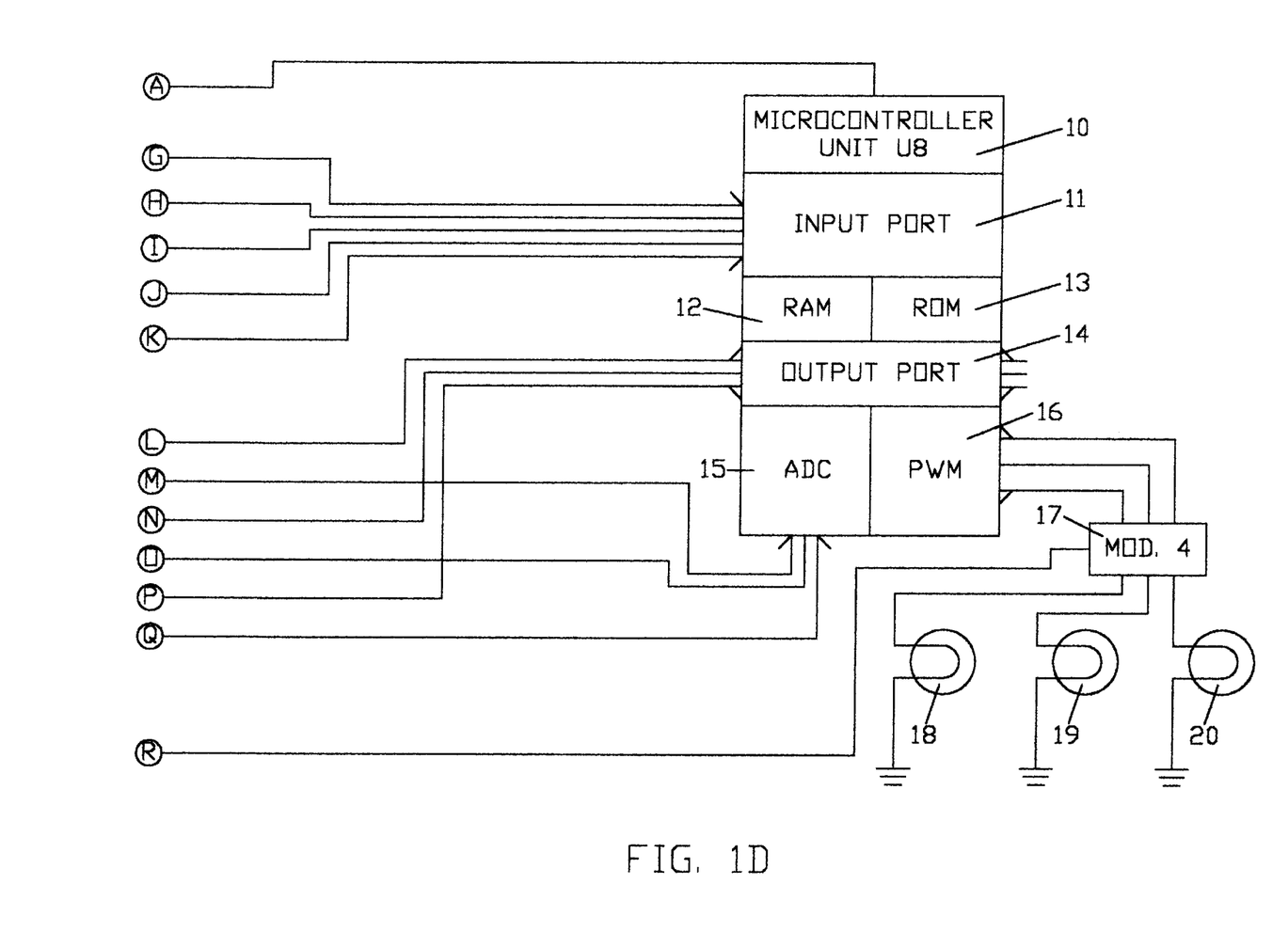
FIG. 1D is a circuit diagram of an alternate embodiment which progressively either increases and decreases the luminosity level of the adverse weather rear light source or light sources, the brake lights, and the turn signal/emergency flasher lights with the use of pulse width modulation as the current visibility conditions either decrease or increase.

In one preferred embodiment of the invention the adverse weather rear light system which is comprised of a light source or light sources 20 of circuit diagram FIG. 1C and FIG. 1D and which are positioned such as to increase the conspicuity of the rear of the non-represented vehicle. Furthermore, the light source or light sources may be either a separate light source or light sources or an integral part of any light source or light sources of the vehicle. The adverse weather rear light system is further comprised of a control system which serves to receive and combine environmental information: relative humidity, temperature, ambient light, and current visibility conditions, and information with respect to the vehicle: the state of the ignition switch, the state of the windshield wiper switch, the state of the brake pedal switch, the state of turn signal switch, and the state of the emergency flasher switch. The microcontroller unit, 10 of circuit diagrams FIG. 1C and FIG. 1D respectively receives and combines the environmental information with that of the vehicle to determine whether the current conditions are such as to automatically activate the adverse weather rear light source or light sources and, if so, to automatically increase the luminous level of the brake lights and the turn signal/emergency flasher lights.

FIG. 1A represents the inputs to the control system with respect to the vehicle status which includes the ignition switch, the windshield wiper switch, the brake pedal switch, the turn signal switch, and the emergency flasher switch. The vehicle battery B1 provides a current to the turn signal switch S1, the brake pedal switch S2, the windshield wiper switch S3, the emergency flasher switch S4, the ignition switch S5, the reversed battery and over voltage protection circuit 1, and to the 5 volt voltage regulator 2. The resistors R1, R3, R5, R7, and R9 provide a path to ground for the logic level down converter 3 of FIG. 1B while the resistor and zener diode network comprised of R2 D1, R4 D2, R6 D3, R8 D4, and R10 D5 serve to protect the logic level down converter 3 inputs of FIG. 1B from voltage and current transients. The outputs A through F of FIG. 1A represent the corresponding inputs A through F to FIG. 1B while the output R of FIG. 1A represents the corresponding input R to FIG. 1C and FIG. 1D respectively.

FIG. 1B represents the inputs A through F from the corresponding outputs A through F of FIG. 1A. Input A provides the 5 volt supply voltage to the logic level down converter 3 and to the solid state relays 7, 8, and 9 while the resistors R11, R12, and R13 serve as current limiting resistors to the light emitting diodes (LED's) of the optical coupled solid state relays 7, 8, and 9 respectively. The inputs B through F to the logic level down converter 3 of FIG. 1B represents the corresponding brake pedal switch, the turn signal switch, the emergency flasher switch, the windshield wiper switch, and the ignition switch outputs B through F from FIG. 1A. The logic level down converter 3 of FIG. 1B converts the turn signal switch, the emergency flasher switch, the brake pedal switch, the windshield wiper switch, and the ignition switch from a 12 volt level to a 5 volt level. The solid state relays 7, 8, and 9 of FIG. 1B provide the 5 volt supply voltage, which either activates or deactivates, the visibility detector module 4, the ambient light detector module 5, and the relative humidity and temperature module 6, also of FIG. 1B. The outputs M, O, and Q from FIG. 1B of the commercially available visibility detector 4, the ambient light detector 5, and the relative humidity and temperature module 6 represent the corresponding inputs M, O, and Q to FIG. 1C and FIG. 1D. The inputs L, N, and P to FIG. 1B represent the corresponding outputs L, N, and P from the output port 14 of FIG. 1C and FIG. 1D. The output port 14 of FIG. 1C and FIG. 1D drive the LED's of the optical coupled solid state relays 7, 8, and 9 of FIG. 1B which provides the 5 volt supply voltage and either activates or deactivates the visibility detector module 4, the ambient light detector module 5, or the relative humidity and temperature module 6.

Figure 2A:
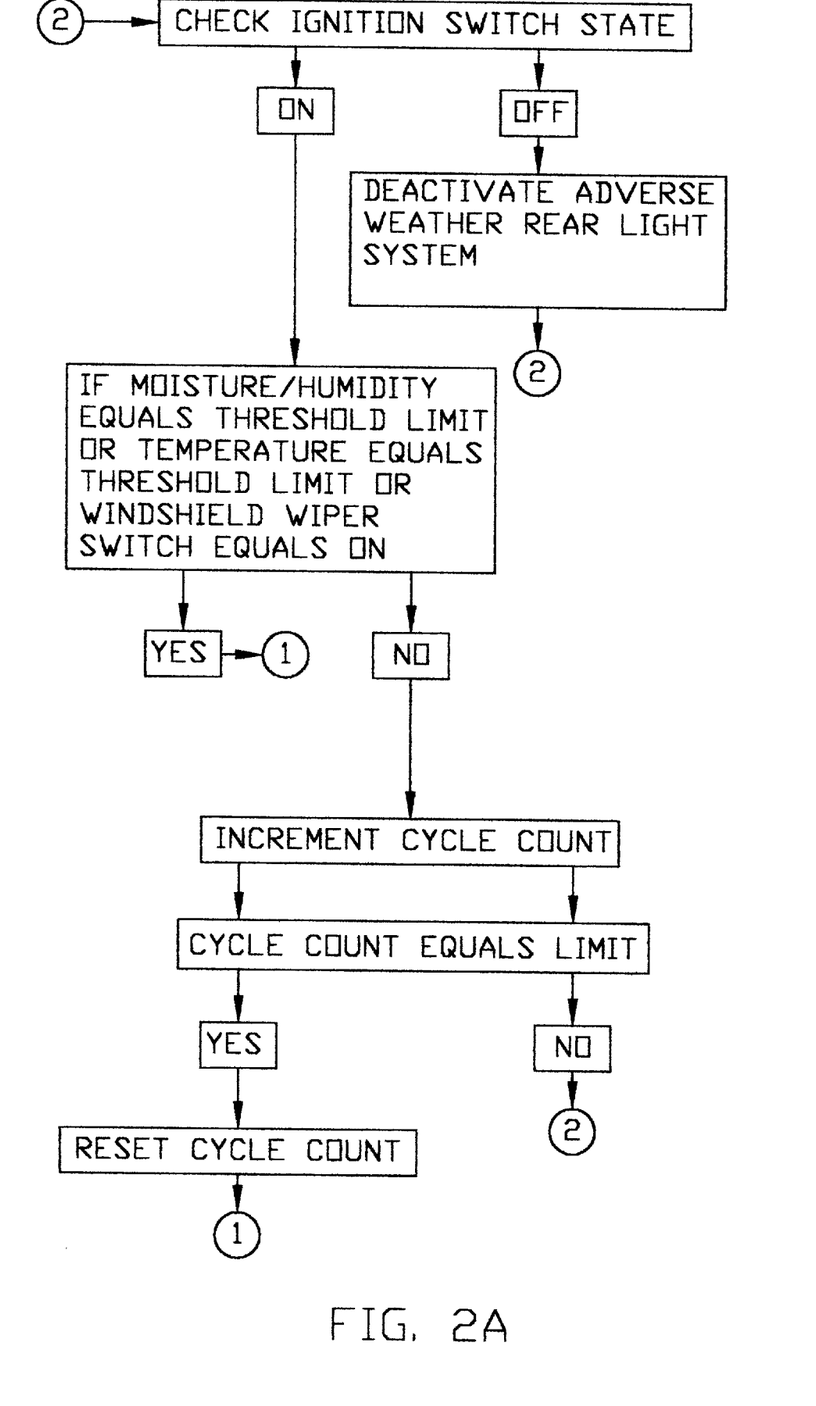
FIG. 2A is the first portion of the general flow chart of the program by which the microcontroller unit may implement the logic of the embodiment of the invention.
Figure 2B:
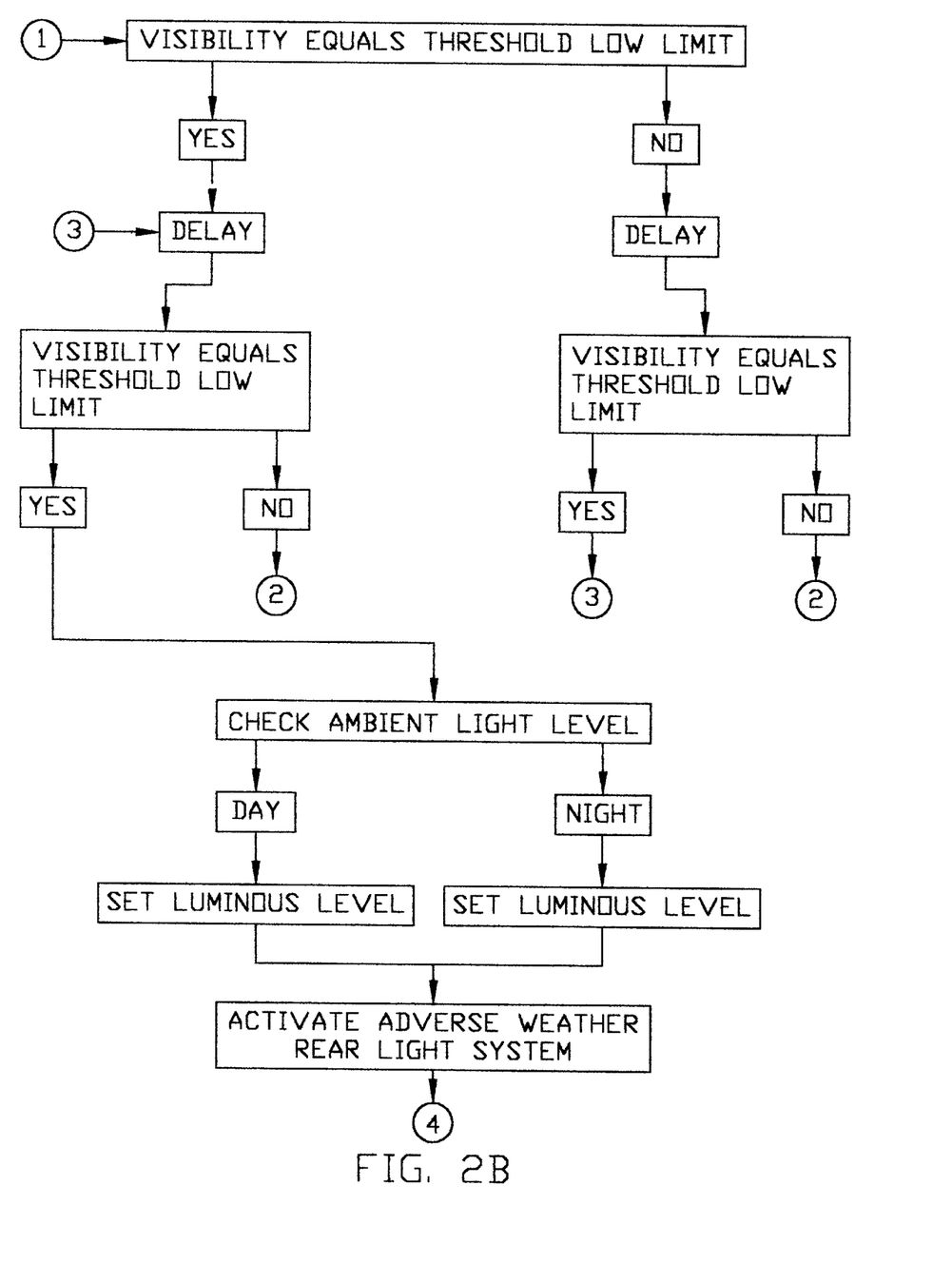
FIG. 2B is the second portion of the general flow chart of the program by which the microcontroller unit may implement the logic of the embodiment of the invention.
Figure 2C:
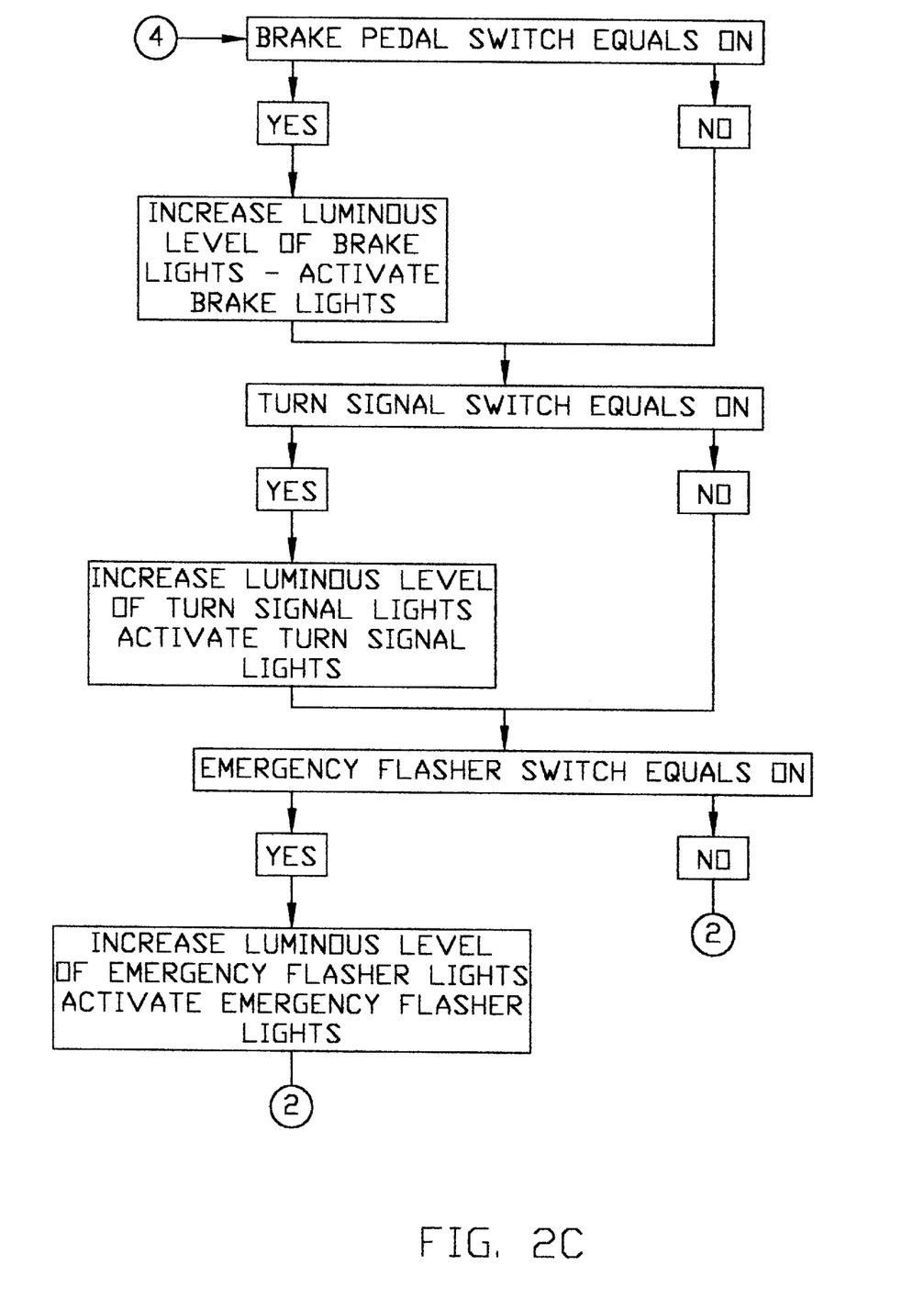
FIG. 2C is the third portion of the general flow chart of the program by which the microcontroller unit may implement the logic of the embodiment of the invention.
Figure 3A:
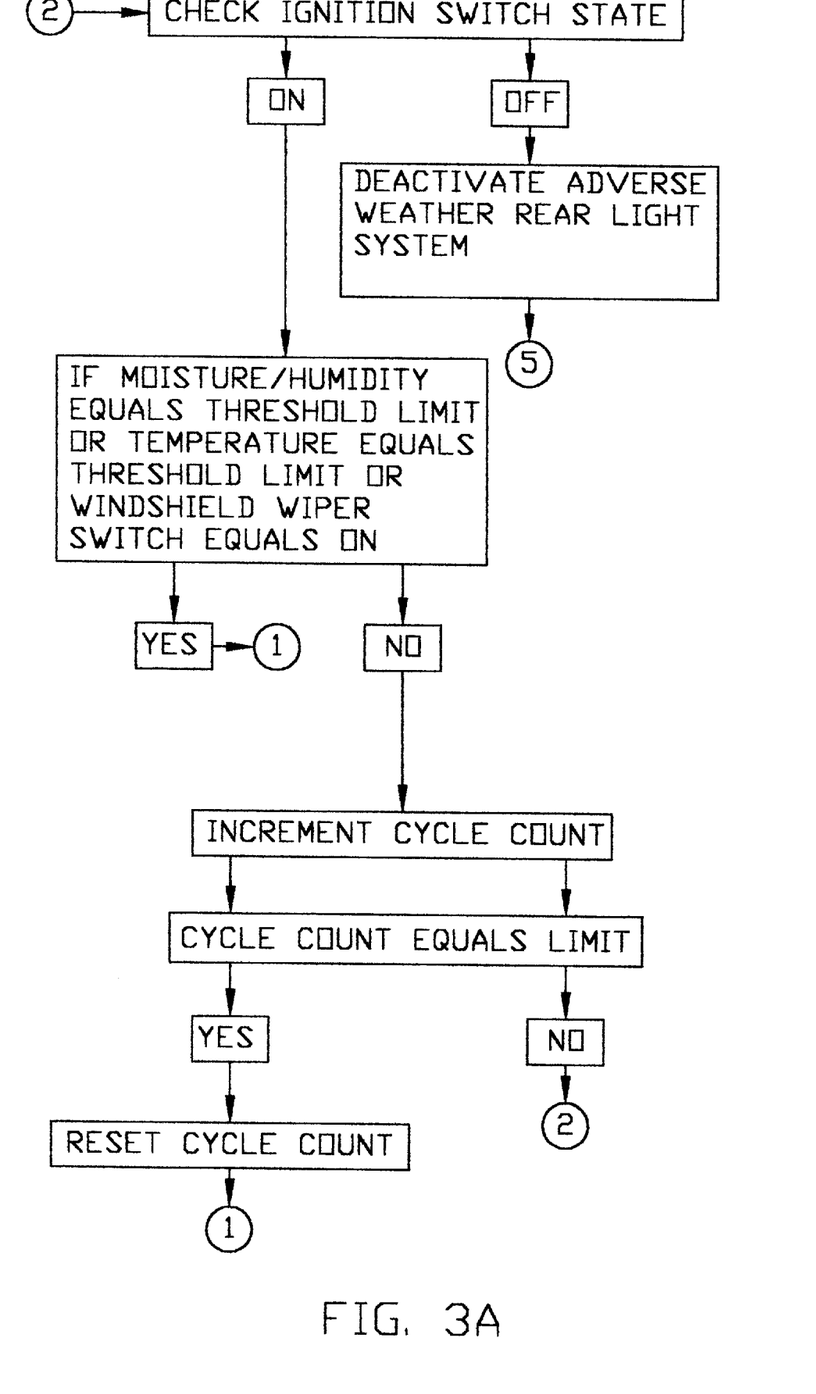
FIG. 3A is the first portion of the general flow chart of the program by which the brake lights and the emergency flasher would continue to operate at an increased luminous level while the ignition is in the off state.
Figure 3B:
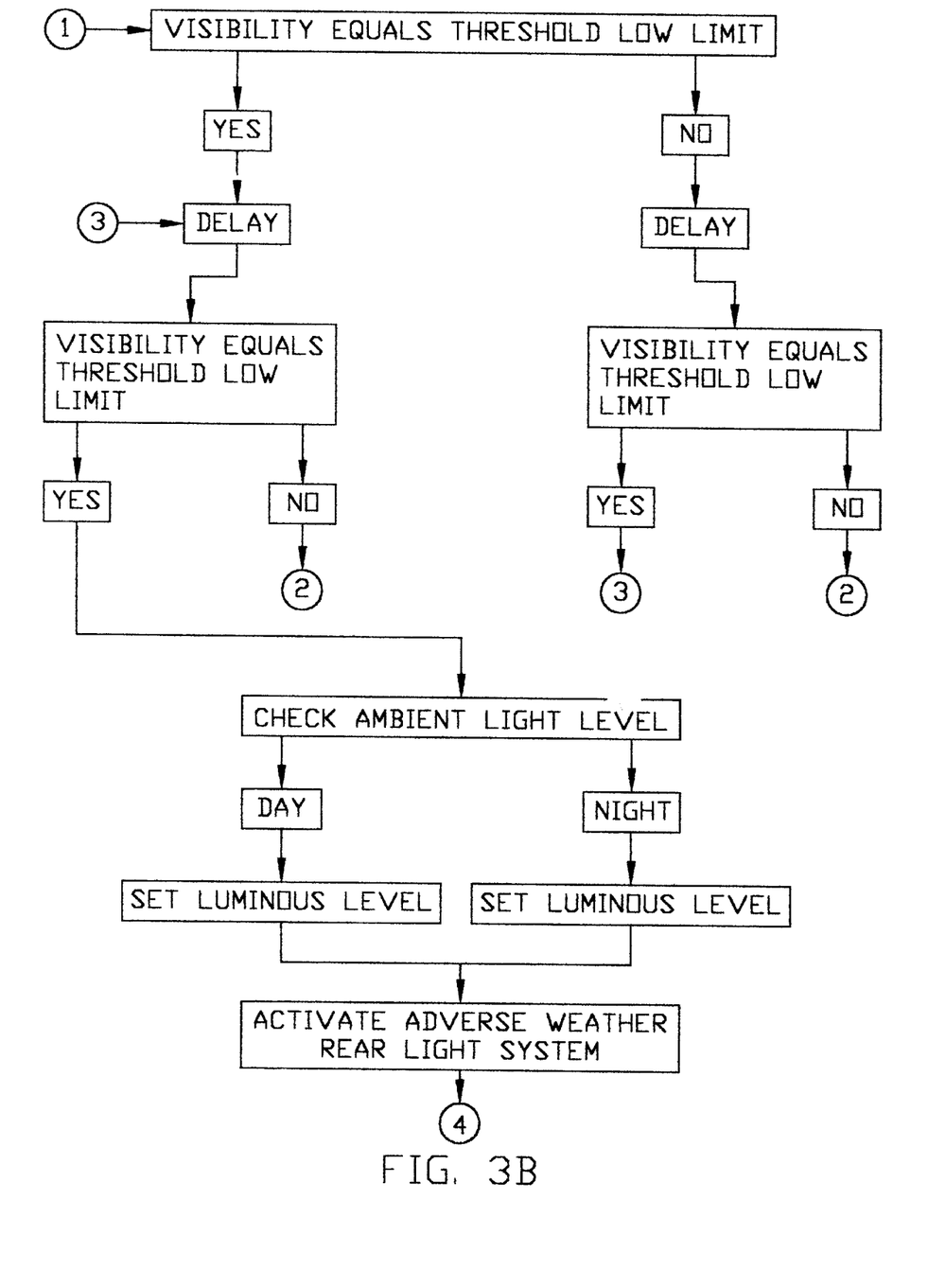
FIG. 3B is the second portion of the general flow chart of the program by which the brake lights and the emergency flasher would continue to operate at an increased luminous level while the ignition is in the off state.
Figure 3C:
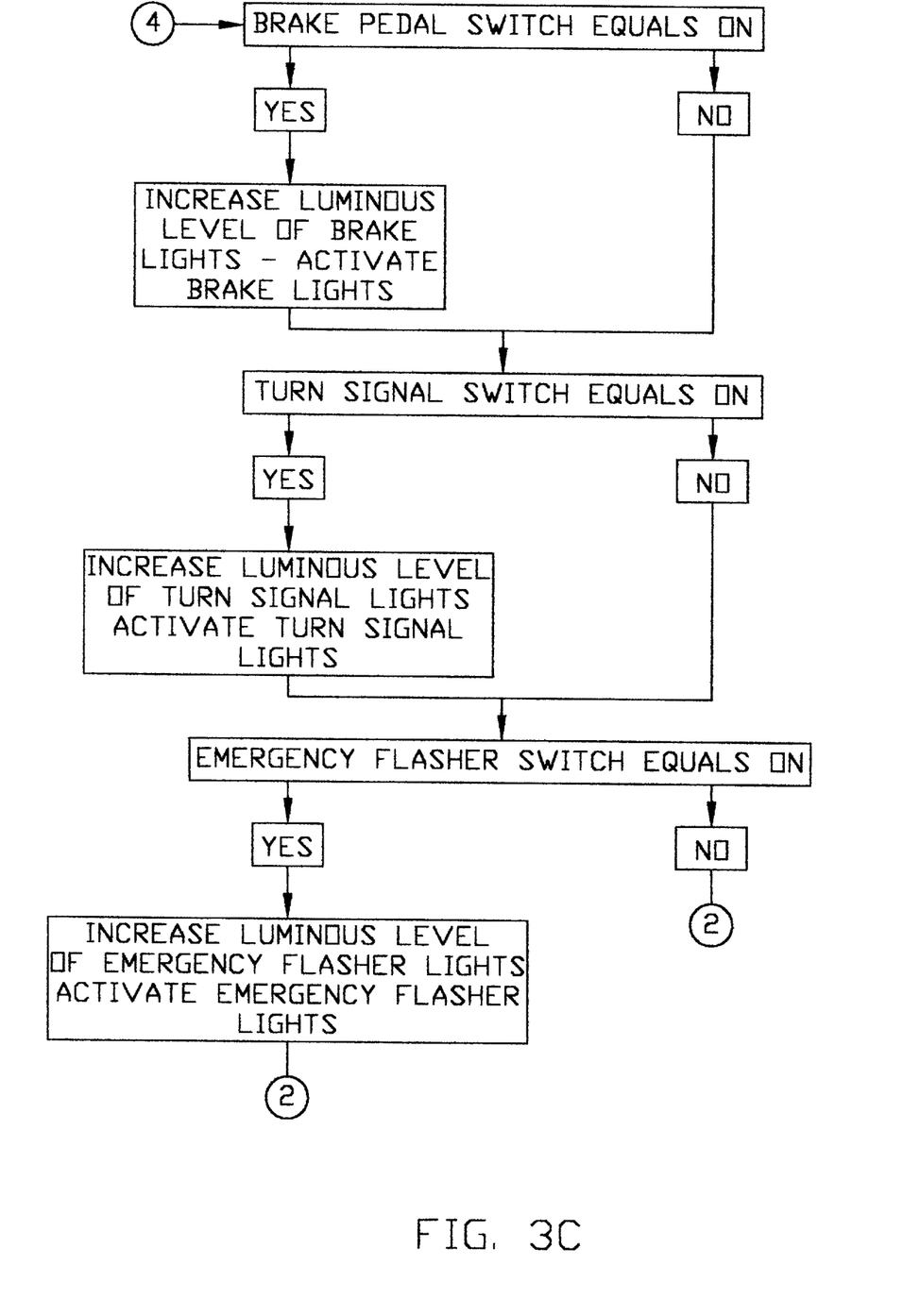
FIG. 3C is the third portion of the general flow chart of the program by which the brake lights and the emergency flasher would continue to operate at an increased luminous level while the ignition is in the off state.
Figure 3D:
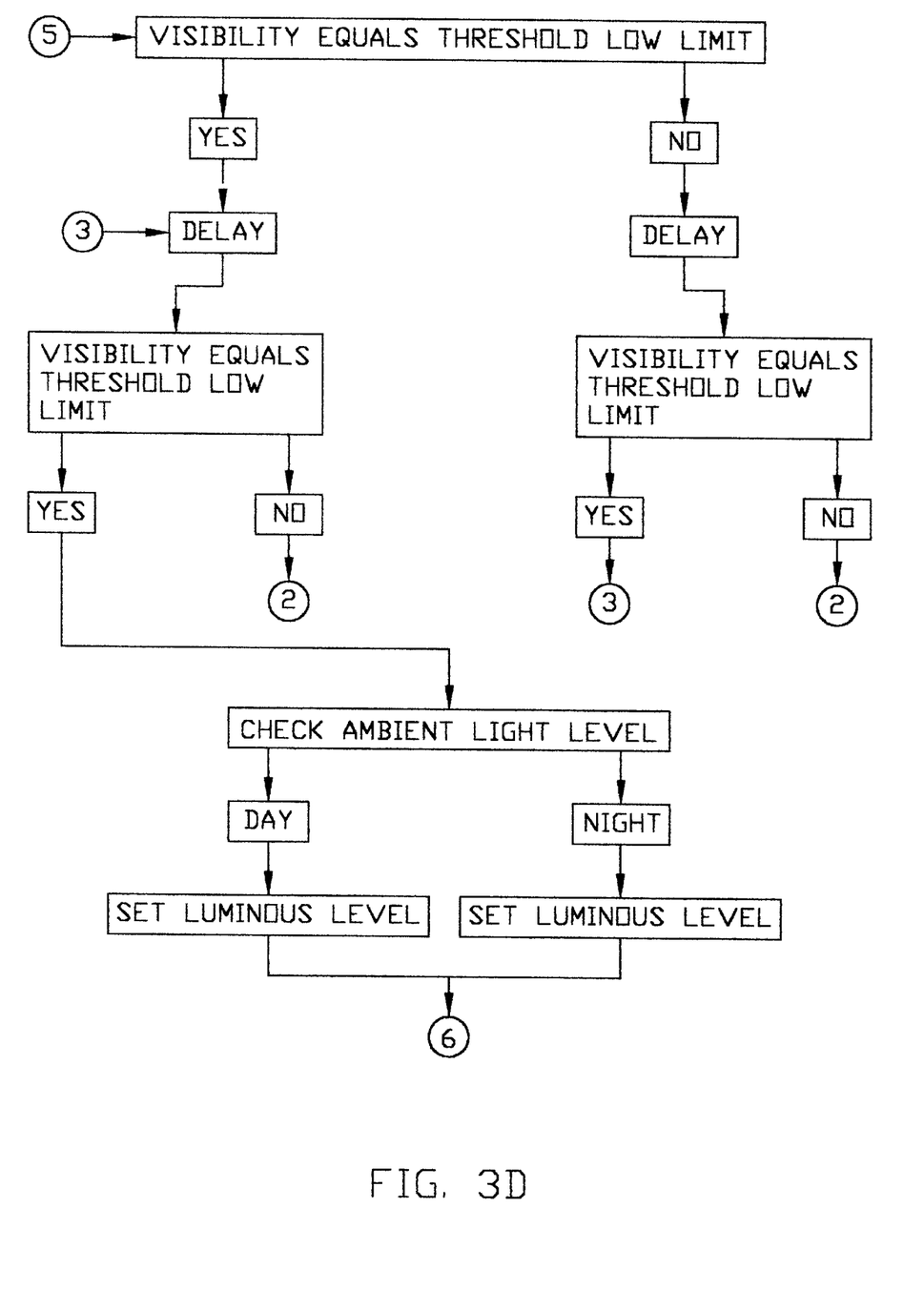
FIG. 3D is the fourth portion of the general flow chart of the program by which the brake lights and the emergency flasher would continue to operate at an increased luminous level while the ignition is in the off state.
Figure 3E:
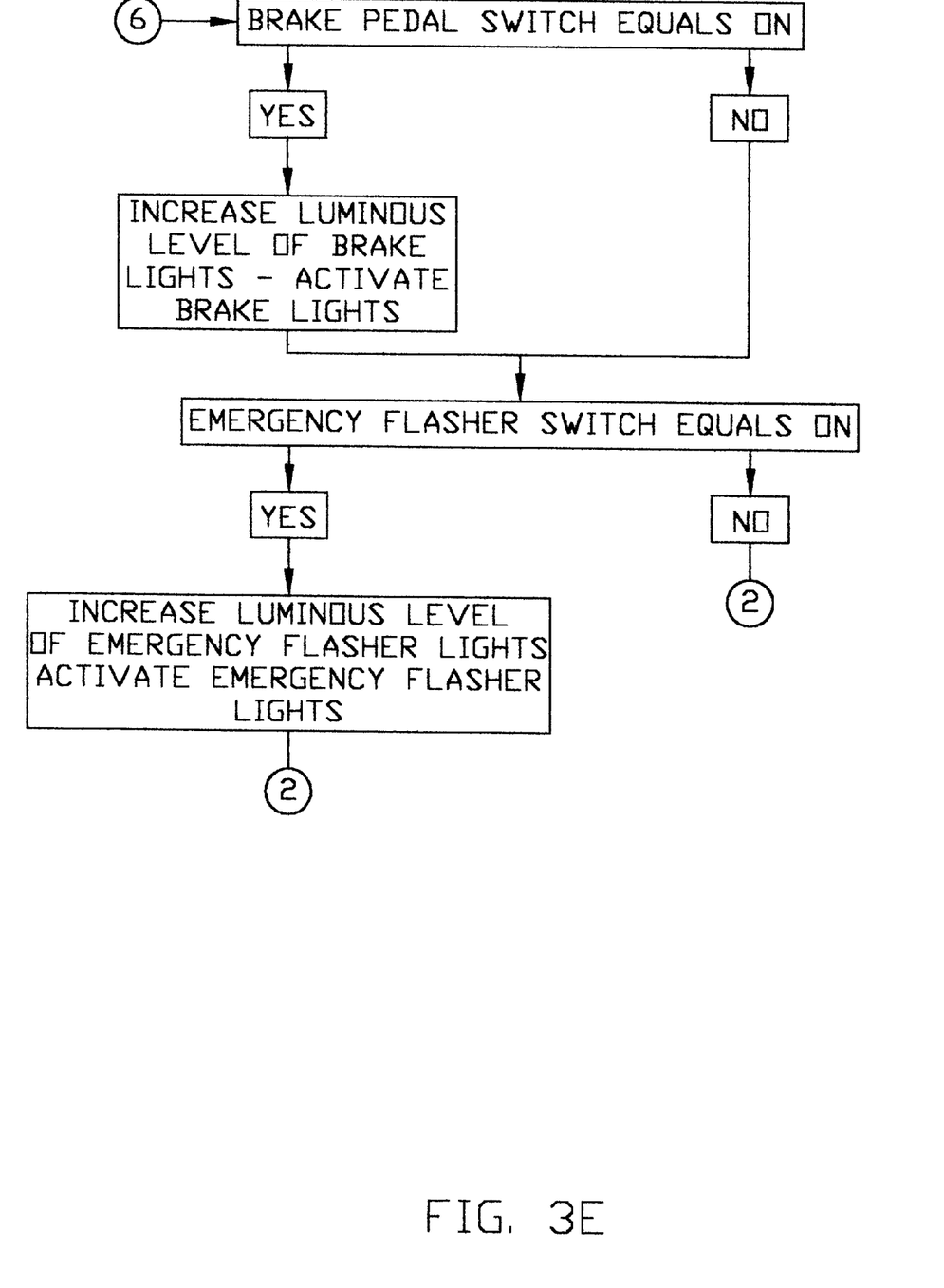
FIG. 3E is the fifth portion of the general flow chart of the program by which the brake lights and the emergency flasher would continue to operate at an increased luminous level while the ignition is in the off state.

FIG. 1C and FIG. 1D represents the inputs A and G through Q from the corresponding outputs A and G through Q of FIG. 1B and input R from the corresponding output R of FIG. 1A. The inputs M, O, and Q to the analog to digital converter 15 of FIG. 1C and FIG. 1D represent the corresponding outputs M, O, and Q from the visibility detector module 4, the ambient light detector module 5, and the relative humidity and temperature module 6 all of FIG. 1B. The visibility detector module 4, the ambient light detector module 5, and the relative humidity and temperature module 6 inputs from FIG. 1B are received by the analog to digital converter 15 of FIG. 1C and FIG. 1D and converted to an eight bit digital value to determine if the conditions are such as to warrant the automatic activation of the adverse weather rear light system. The respective figures FIG. 1C and FIG. 1D also represent the microcontroller unit 10, which includes an onboard input port 11, onboard RAM 12, onboard ROM 13 where the control program shown in FIG. 2A, FIG. 2B, and FIG. 2C, is permanently resident, an onboard output port 14, an onboard multi-channel pulse width modulation circuit 16, and an onboard multi-channel analog to digital converter 15. The microcontroller unit 10 of FIG. 1C and FIG. 1D serves to receive and combine and process the environmental conditions and the state of the vehicle. FIG. 1C and FIG. 1D further represents the adverse weather rear light switch system 17 which is comprised of either metal oxide semiconductor field effect transistors (MOSFETs) or relays and are controlled by either the microcontroller output port 14 or the multi-channel pulse width modulation circuit 16, to either activate or deactivate the adverse weather rear light source or light sources 20, and to increase the luminous level of the brake lights 19 and the turn signal/emergency flasher lights 18. The input A to FIG. 1C and FIG. 1D from the corresponding output A of FIG. 1B provides the 5 volt supply voltage to the microcontroller unit 10. The outputs G through K from the logic level down converter 3 of FIG. 1B represents the corresponding inputs G through K to the input port 11 of FIG. 1C and FIG. 1D, which receives and combines the state of the vehicle: the turn signal switch, the emergency flasher switch, the brake pedal switch, the windshield wiper switch, and the ignition switch. The input R to FIG. 1C and FIG. 1D represents the corresponding output R from FIG. 1A which provides the 12 volt supply voltage to the adverse weather rear light switch system 17 of FIG. 1C and FIG. 1D. The adverse weather rear light switch system 17 of FIG. 1C and FIG. 1D is either activated and deactivated by either the output port 14 or the multi-channel pulse width modulation circuit 16 of FIG. 1C and FIG. 1D. The multi-channel pulse width modulation circuit 16 of FIG. 1D progressively either increases or decreases the luminosity of the adverse weather rear light source or light sources, the brake lights, and the turn signal/emergency flasher lights depending upon the current visibility conditions.

FIG. 2A, FIG. 2B, and FIG. 2C represent the control program which permanently resides in the microcontroller ROM 13 of FIG. 1C and FIG. 1D. Referring to FIG. 2A, the state of the ignition switch is first checked and if the ignition switch is in the off state then the adverse weather rear light system would be deactivated and the next program instruction executed would point 2 of FIG. 2A. If however, the ignition switch is the on state then the next program instruction executed would be to check the relative humidity, the temperature, and the state of the windshield wiper switch. If either the relative humidity or the temperature exceeds the threshold limit, which would be an indication of adverse weather, or if the windshield wiper switch is in the on state then the next instruction would proceed to point 1 of FIG. 2B. However, if either the relative humidity and the temperature do not exceed the threshold limit and the windshield wipers are in the off state then the cycle counter would be incremented and if the number of cycles equals the limit then the cycle counter would be reset and the next program instruction executed would be point 1 of FIG. 2B. Otherwise, if either the relative humidity and the temperature do not exceed the threshold limit and the windshield wipers are in the off state and if the number of cycles is less than the limit then the next instruction executed would be point 2 of FIG. 2A.

If any of the conditions from FIG. 2A result in a visibility check then the next program instruction executed would be point 1 of FIG. 2B. If the current visibility conditions of FIG. 2B is equal to or less than the low visibility threshold limit then the current visibility conditions are again checked. If the current visibility conditions, of FIG. 2B, again are equal to or less than the low visibility threshold limit then the next program instruction executed, of FIG. 2B, would check the ambient light level. If the ambient light level is equal to night then the adverse weather rear light source or light sources are activated, in accordance with federal and/or state standards, at a lower luminous level than if the ambient light level is equal to day. The next program instruction executed would be point 4 of FIG. 2C. Otherwise if the second visibility check of FIG. 2B indicates that the visibility is greater than the low visibility threshold limit then the next program instruction executed would be point 2 of FIG. 2A. If, however, the initial visibility check of FIG. 2B is greater than the low visibility threshold limit then the current visibility conditions are again checked, and if the current visibility conditions are equal to or less than the low visibility threshold limit then the next instruction executed would be point 3 of FIG. 2B where the current visibility conditions are again checked. Otherwise, if the current visibility conditions of FIG. 2B are greater than the low visibility threshold limit then the next program instruction executed would be point 2 of FIG. 2A.

If the adverse weather rear light system of FIG. 2B has been automatically activated then the next program instruction executed would be to check the state of the brake pedal switch. If the brake pedal switch is in the on state then the brake lights are activated such that the luminous level of the brake lights is greater than the luminous level of the adverse weather rear light source or light sources then the next program instruction executed would be to check the state of the turn signal switch. Otherwise, if the adverse weather rear light system is in an active state and the brake light switch the off state then the next program instruction executed would proceed to check the state of the turn signal switch.

If the turn signal switch of FIG. 2C is in the on state then the next program instruction executed would be to activate the turn signal lights such that the luminous level of the turn signal lights is greater than the luminous level of the adverse weather rear light source or light sources and the next program instruction executed would be to check the state of the emergency flasher switch. Otherwise, if the turn signal switch is in an off state then the next program instruction executed would proceed to check the state of the emergency flasher switch.

If the emergency flasher switch of FIG. 2C is in the on state then the next program instruction executed would be to activate the emergency flasher lights such that the luminous level of the emergency flasher lights is greater than the luminous level of the adverse weather rear light source or light sources and the next program instruction executed would return to point 2 of FIG. 2A. Otherwise, if the emergency flasher switch is in an off state then the next program instruction executed would proceed to point 2 of FIG. 2A.

Another preferred embodiment of the invention progressively increases or decreases luminous level of the adverse weather rear light source or light sources 20 the brake lights 19, and the turn signal/emergency flasher lights 18 of FIG. 1D. This embodiment of the invention would progressively increase the luminosity of the adverse weather rear light source or light sources 20 and increase the luminosity of the brake lights 19, and the turn signal/emergency flasher lights 18 of FIG. 1D such that the luminosity of the brake lights 19 and the turn signal/emergency flasher lights 18 of FIG. 1D would be greater than the luminosity of the adverse weather rear light source or light sources 20 of FIG. 1D as the current visibility conditions decrease due adverse weather, smoke, or dust.

Figure 4:
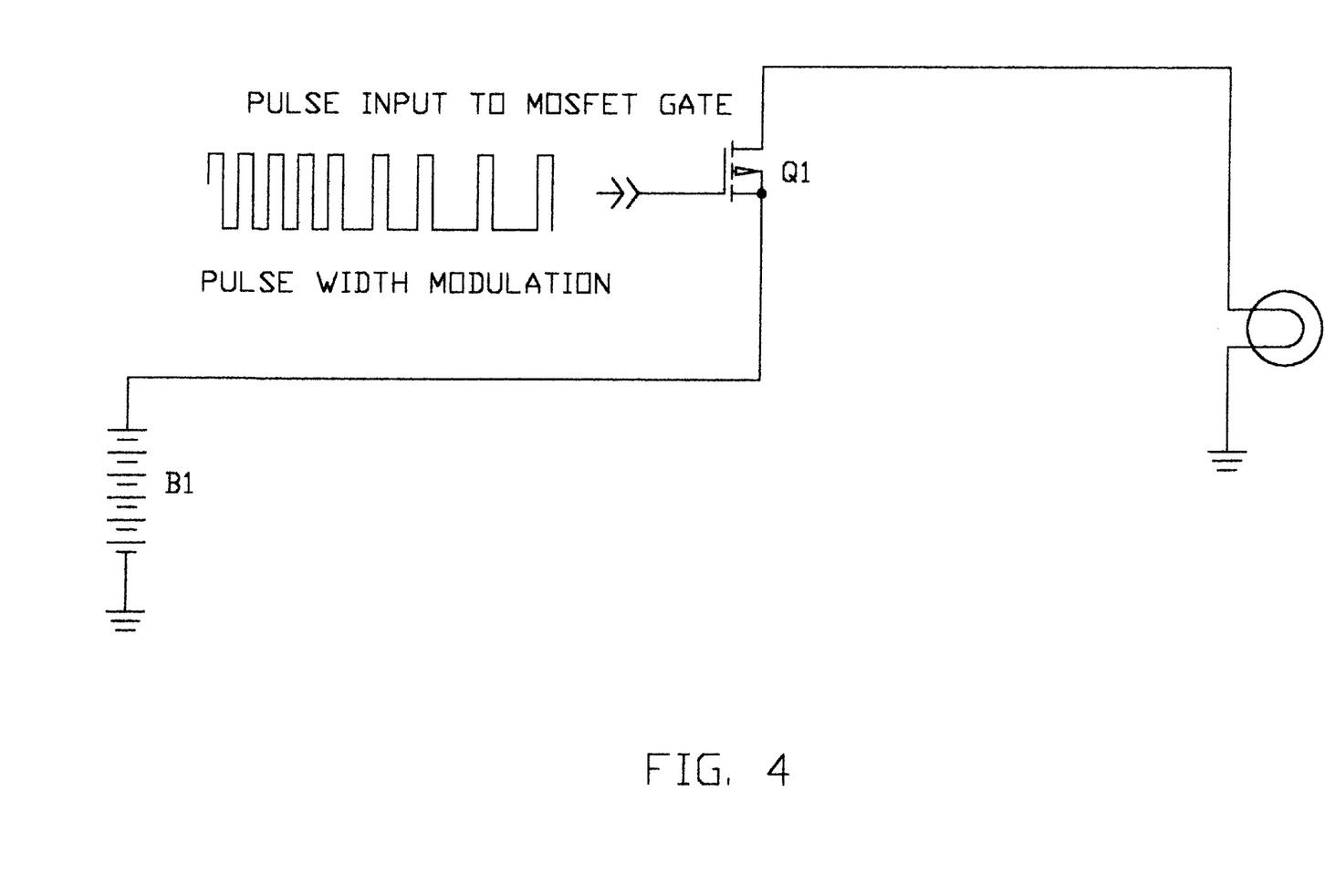
FIG. 4 is a circuit diagram of the adverse weather rear light pulse width modulation switch system.

Likewise luminosity of the adverse weather rear light source or light sources 20, the brake lights 19, and the turn signal/emergency flasher lights 18 of FIG. 1D would progressively decrease as the current visibility conditions increase. However, as the current visibility conditions increase, the luminosity of the brake lights 19, and the turn signal/emergency flasher lights 18 of FIG. 1D is would remain greater than the luminosity of the adverse weather rear light source or light sources 20 of FIG. 1D. Furthermore, when the current visibility conditions are greater than the low visibility threshold limit the adverse weather rear light source or light sources 20 of FIG. 1D would deactivate and both the brake lights 19 and the turn signal/emergency flasher lights 18 of FIG. 1D would return to the standard luminous level. In this embodiment of the invention, represented in the circuit diagram of FIG. 1D, the means to progressively increase or decrease the luminous level of the adverse weather rear light source or light sources, the brake lights, and the turn signal/emergency flasher lights, depending upon the current visibility conditions, is through pulse width modulation. The pulse width modulation circuit 16 of FIG. 1D would vary the duty cycle which is applied to the MOSFET gates of the of the adverse weather rear light switch system 17 of FIG. 1D and FIG. 4. This in turn would vary the luminosity level of the light source or light sources 20, the brake lights 19, and the turn signal/emergency flasher lights 18 of FIG. 1D. This embodiment of the invention offers an additional benefit over an adverse weather rear light system with one single luminous level. The benefit to either progressively increase or decrease the luminosity level of the light source or light sources 20, brake lights 19, and turn signal/emergency flasher light 18 of FIG. 1D is that it would provide adequate conspicuity to the rear of the vehicle for the current visibility conditions and would avert blinding or irritating an approaching motorist which could result in either an accident or incite a road rage incident, which is increasing at an alarming rate.

Another implementation shown in FIG. 3A through FIG. 3E is if the ignition switch is in the off state and the current visibility conditions are less than the low visibility threshold limit, the brake lights and the emergency flasher lights would continue to operate at an increased luminous level so that these lights are visible from a distance as mandated by federal or state standards. Likewise, when the current visibility conditions are greater than the low visibility threshold limit the brake lights and the emergency flasher lights would then operate at the standard luminous level. Additionally, the embodiments of the invention also could include to either activate or deactivate all vehicle lights in conjunction with either activation or deactivation of the adverse weather rear light system.

The present invention is in no way restricted to the specific disclosure of the specification and drawings, but encompasses any modifications within the scope of the claims.

What is claimed is:

1. An adverse weather rear light system for vehicles which is comprised of a light source or light sources and is positioned to increase the conspicuity of the rear of a vehicle during periods of decreased visibility due to either adverse weather, smoke, or dust; a means to collect, receive, and combine the current state of the vehicle, the current environmental conditions, the current visibility conditions, and the current ambient light conditions; a control means whereby the adverse weather rear light system is automatically energized when the current visibility conditions are less than a low visibility threshold Limit and wherein the adverse weather rear light system is automatically de-energized when the current visibility conditions are greater than the low visibility threshold limit.

2. The adverse weather rear tight system according to claim 1 whereby the luminosity level of the light source or light sources would automatically increase when the adverse weather rear light system is in an active state and wherein the control means of the light source or light sources would either automatically de-energize or decrease the luminosity of the light source or light sources to a federal standard luminous level when the adverse weather rear light system is in a de-energized state, furthermore, where the light source or light sources is an integral part of any existing light source or light sources of a vehicle.

3. The adverse weather rear light system according to claim 2 wherein the luminosity of a brake light, a turn signal light, or an emergency flasher light would automatically increase so that the luminosity of a brake light, a turn signal light or an emergency flasher light is always greater than the luminosity of the adverse weather rear light source or light sources when the adverse weather rear light system is in an energized state and either a brake light switch is in an on state, a turn signal switch is in an on state, or an emergency flasher switch is in an on state, furthermore, where the luminosity of the brake light, the turn signal light, or the emergency flasher light would function at a federal standard luminous level when the adverse weather rear light system is in a de-energized state.

4. The adverse weather rear light system according to claim 3 whereby the light source or light sources of the adverse weather rear light system would automatically be de-energized when an ignition switch is in an off state.

5. The adverse weather rear light system according to claim 4 whereby a brake light and an emergency flasher light would function at an increased luminous level when the current visibility conditions are less than a low threshold limit and when an ignition switch is in an off state, furthermore the brake light and the emergency flasher light would function at a federal standard luminous level when the current visibility conditions are greater than the low visibility threshold limit and when the ignition switch is in the off state.

6. The adverse weather rear light system according to claim 5 whereby the luminous level of the light source or light sources, a brake light, a turn signal light, and an emergency flasher light would automatically be reduced during low ambient light conditions.

7. The adverse weather rear light system according to claim 6 whereby all vehicle lights are energized and de-energized in conjunction with the activation and the deactivation of the adverse weather rear light system.

8. The adverse weather rear light system according to claim 1 whereby the adverse weather rear light system is automatically energized when the current visibility conditions are less than a low visibility threshold limit, whereby the control means would progressively increase the luminosity level of the light source or light sources as the current visibility conditions progressively decrease, and where the control means would progressively decrease the luminosity level of the light source or light sources as the current visibility conditions progressively increase and wherein the adverse weather rear light system is automatically de-energized when the current visibility conditions are greater than a low visibility threshold limit, furthermore, where the light source or light sources is an integral part of any existing light source or light sources of a vehicle.

9. The adverse weather rear light system according to claim 8 wherein the luminosity of a brake light, a turn signal light, or an emergency flasher light is always greater than the luminosity of the adverse weather rear light source or light sources when the adverse weather rear light system is in an energized state and either a brake light switch is in an on state, a turn signal switch is in an on state, or an emergency flasher switch is in an on state, furthermore, whereby the luminosity of the brake light, the turn signal light, or the emergency flasher light would function at a federal standard luminous level when the adverse weather rear light system is in a de-energized state.

10. The adverse weather rear light system according to claim 9 whereby when an ignition switch is in an off state the adverse weather rear light source or light sources are automatically deactivated.

11. The adverse weather rear light system according to claim 10 whereby when an ignition switch is in an off state and the current visibility conditions are less than a low visibility threshold limit, a brake light and an emergency flasher light would function at an increased luminosity level and when the current visibility conditions are greater than the low visibility threshold limit the brake light and the emergency flasher light would function at a federal standard luminous level.

12. The adverse weather rear light system according to claim 11 whereby the luminous level of the light source or light sources, a brake light, a turn signal light, and an emergency flasher light would automatically be reduced during low ambient light conditions.

13. The adverse weather rear light system according to claim 12 whereby all vehicle lights are energized and de-energized in conjunction with the activation and the deactivation of the adverse weather rear light system.

* * * * *